United States Patent
El-Hakim et al.

[11] Patent Number: 6,009,359
[45] Date of Patent: Dec. 28, 1999

[54] MOBILE SYSTEM FOR INDOOR 3-D MAPPING AND CREATING VIRTUAL ENVIRONMENTS

[75] Inventors: Sabry F. El-Hakim, Ottawa; Pierre Boulanger, Aylmer, both of Canada

[73] Assignee: National Research Council of Canada, Ottawa, Canada

[21] Appl. No.: 08/714,325

[22] Filed: Sep. 18, 1996

[51] Int. Cl.[6] .................................................. G06G 7/78
[52] U.S. Cl. .............................. 701/28; 701/25; 348/135
[58] Field of Search ..................................... 348/119, 135, 348/139, 142; 701/25, 28

[56] References Cited

U.S. PATENT DOCUMENTS

| | | |
|---|---|---|
| 2,933,008 | 4/1960 | Barnett . |
| 2,989,890 | 6/1961 | Dressler . |
| 5,081,585 | 1/1992 | Kurami et al. ............................. 701/28 |
| 5,155,684 | 10/1992 | Burke et al. .............................. 701/25 |
| 5,172,315 | 12/1992 | Asanuma et al. ......................... 701/28 |
| 5,220,441 | 6/1993 | Gerstenberger .......................... 358/487 |
| 5,247,356 | 9/1993 | Ciampa .................................... 358/109 |
| 5,668,595 | 9/1997 | Katayama et al. ....................... 348/218 |

*Primary Examiner*—V Lissi Mojica
*Attorney, Agent, or Firm*—Neil Teitelbaum & Associates

[57] ABSTRACT

A mobile mapping system is designed to generate a geometrically precise three-dimensional detailed model of an unknown indoor environment. There is no limit on the distance the mobile system may travel, nor on the type of details that can be mapped. The same design is used for environments ranging from simple office hallways to long winding underground mine tunnels. Surfaces and features can be mapped from images acquired by a unique configuration of different types of optical imaging sensors and positioning devices. This configuration ensures that all the information required to reconstruct the three-dimensional environment is included in the collected images. Provided a sufficient overlap between two-dimensional intensity images and combining such with three-dimensional range images, the method reconstructs an environment by adjusting a plurality of images simultaneously.

15 Claims, 6 Drawing Sheets

MOBILE SYSTEM FOR INDOOR 3-D MAPPING AND CREATING VIRTUAL ENVIRONMENTS

FIELD OF THE INVENTION

The invention relates to a method of model generation and more particularly to a method of generating three dimensional models from range and intensity images.

BACKGROUND OF THE INVENTION

A key in navigation through virtual environments or designing autonomous vehicles (that can successfully navigate through and manipulate their environment) is the ability to effectively create, maintain, and use an accurate 3-D model of a desired world. A system which can rapidly, reliably, remotely and accurately perform measurements in three-dimensional space for the mapping of indoor environments is required for many applications.

The literature reports a spectrum of mobile mapping and navigation technologies and systems, the majority of which are either in a prototype stage or in a design/simulation stage. Among these systems, none is suitable for indoor mapping since they either do not meet the accuracy requirement or use sensors not suited for indoor applications.

Table 1 displays the properties of four mapping and three navigation systems. Mobile mapping systems combine absolute and relative positioning devices and imaging sensors to locate features in a global reference system. The absolute positioning sensors provide the framework for all other data collected by the relative positioning sensors. Global positioning systems (GPS) are used in all mobile mapping systems which claim high absolute accuracy. Other positioning sensors such as inertial navigation systems (INS) and/or dead-reckoning devices are also required for positioning and orientation to fill in the gaps when a GPS signal is interrupted or temporarily obstructed. When the data from these sensors are properly integrated, a continuous and accurate tracking of the absolute vehicle position becomes possible.

In order to determine the position of the features and details to be mapped, imaging sensors such as charge-coupled devices (CCD cameras) are used. These cameras will determine the feature position relative to the vehicle. Since the vehicle's absolute position in a global coordinate system is known from the absolute positioning sensors, any mapped feature relative to the vehicle can easily be transferred to this global system. The final accuracy is a function of the accuracy of each of the individual sensors, the calibration and registration of the sensor positions relative to each other, and the rigorous processing and integration of data. Currently the best achievable accuracy reported from existing systems, using state-of-the-art GPS/INS/digital CCD cameras, is 1–3 m (RMS) in the global framework and 0.5 m for relative position between features.

From table 1, it is obvious that the mapping systems which claim high accuracy are all designed for road mapping and not useful for indoor application since they all rely on GPS for positioning. They also use stereo vision alone to obtain the relative position of features, thus only an incomplete 3-D map can be constructed. Although the navigation systems do not use GPS and incorporate laser scanners for complete 3-D mapping, they do not construct a complete map and do not require absolute accuracy. The main application areas of these systems are highway or road mapping, structural clearance measurements along railways, and aerial topographic mapping. Since most of the existing prototypes for mobile mapping systems do not use laser scanners (those are used only in navigation systems) many surface details are not detected (using only passive CCD cameras).

For mapping applications, GPS provides accurate location information. In some locations, GPS signals may not be available and estimation of absolute location is made. Once a GPS signal is again acquired, absolute distance is established, thereby correcting any error which was introduced by the estimation. For use indoors, GPS is not available as it requires signal reception of satellite transmissions. Over a small distance, estimation of absolute location allows for relatively good modeling results. Unfortunately, errors propagate from each estimate to all subsequent estimates because each estimate of location is at best based on a previous estimate. In modeling a mine or a building, the cumulative errors result in unacceptable inaccuracies.

In many of the above noted systems, measurements are made relative to a mobile platform while a precise absolute

TABLE 1

Typical mobile mapping and navigation systems

| Organization | System Name | Sensors | Application |
|---|---|---|---|
| Ohio State U., USA | GPSVan | GPS, INS, wheel counter, CCD& color video cameras | Road Mapping |
| U. Armed Forces, Germany | KiSS | GPS, INS, Odometer, Altimeter, CCD& color video cameras. | Road Mapping |
| Tech. School Aachen, Germany | Surveying Vehicle | GPS, Wheel sensors, Barometer, stereo CCDs | Road Mapping |
| Geofit Inc., Canada | VISAT | GPS, INS, CCD & color video cameras. | Road Mapping |
| CMU, USA | Ambler | Laser radar scanner, dead reckoning devices. | Local mapping for locomotion |
| CMU, USA | Navlab | Stereo CCDs, laser radar scanner, Doppler, sonar. | Navigation |
| Lockheed-Martin & 10 other companies and research labs. | UGV-RSTA | Color, infrared stereo video cameras, laser radar, GPS, tilt meters, flux-compass | Navigation /recognition (Military) | position is not determined due to inaccuracy (error accumulation) of dead-reckoning devices (wheel odometers) or inertial navigation systems. Further, absolute locations are not determined because they are unnecessary. In navigation, a question to be answered is how a device is to move from where it is. It need not establish where it is. Thus, cumulative error in mapping is insignificant, and error correction solely for navigational purposes occurs as necessary. For navigation, differential comparisons between frames is performed to establish differences from where a device was to where it is now.

OBJECT OF THE INVENTION

In an attempt to overcome these and other limitations of the prior art, it is an object of the present invention to provide a substantially accurate modeling method and apparatus for producing models from a moving platform.

SUMMARY OF THE INVENTION

In a first broad embodiment the invention seeks to provide a method of locating at least a surface and modeling the surface comprising the steps of:

repeating the following steps:
  i) using at least two image capture means having a known spatial relationship therebetween, capturing with each image capture means an image, each of the at least two of image capture means having an image overlapping an image of at least another image capture means from the at least two image capture means;
  ii) moving the at least two image capture means to a new location such that each image captured from the new location overlaps at least a previously captured image until a plurality images have been captured of substantially the entire surface;
b) within each image from the plurality of images using a processor to identify distinguishable features;
c) using a processor, aligning identified features in overlapped images using the known spatial relationship between the at least two image capture means as constraints to determine correlations of spatial relations for overlapped images; and
d) using a processor, locating the at least a surface and modeling the at least a surface by determining the at least a surface that substantially best approximates the correlations and is within the constraints.

6. A method of locating at least a surface and modeling the surface comprising the steps of:
  (a) providing intensity images from a plurality of image capture means having a known spatial relation said images overlapping in part;
  (b) providing range images from at least a range image capture means said images overlapping the intensity images at least in part and overlapping at least some other range images in part;
  (c) providing registration information in dependence upon known spatial relations between each of the plurality of the image capture means and the at least a range imaging means;
  (d) extracting distinguishable features from each intensity image and each range image;
  (e) using a processor, correlating the intensity images and the range images in dependence upon the registration information and extracted features located within a plurality of intensity and range images; and
  (f) using a processor, locating at least a surface and constructing a model in dependence upon the intensity images and the range images by overlaying at least some intensity images onto the surface in a fashion that best approximates the correlations.

In accordance with the invention there is further provided a system for modeling three dimensional space comprising:
  (a) a movable platform means;
  (b) a plurality of image capture means coupled to said movable platform means in known locations and for capturing a plurality of intensity images at least some of the images overlapping each other;
  (c) at least a range image capture means coupled to said movable platform means in at least a known location and for capturing a plurality of range images;
  (d) a memory means for receiving the captured intensity images and the captured range images and for storing information indicative of a spatial relation between the captured intensity images and the captured range images and for storing the images; and
  (e) processor means coupled to the memory means for correlating the plurality of stored intensity images, the plurality of stored range images, the known locations of the intensity image capture means, and the known location of the range image capture means and generating a model in dependence upon the correlation.

In accordance with another aspect of the invention there is provided a system for modeling three dimensional space comprising: a movable platform means; a plurality of image capture means coupled to said movable platform means in predetermined locations and for capturing a plurality of intensity images at least some of the images overlapping each other; at least a range image capture means coupled to said movable platform means in at least a predetermined location and for capturing a plurality of range images; a memory means for storing information indicative of a spatial relation between captured images and for storing captured range images and captured intensity images; and means for correlating the plurality of captured intensity images, the plurality of captured range images, the predetermined locations of the intensity image capture means, and the predetermined location of the range image capture means and generating a model in dependence upon the correlation.

BRIEF DESCRIPTION OF THE DRAWINGS

An exemplary embodiment of the invention will now be discussed in conjunction with the attached drawings in which.

DETAILED DESCRIPTION OF THE INVENTION

The system is designed to produce substantially accurate modeling of indoor surfaces such as those found in buildings, caves or in a mine. A considerable amount of work has been done in the field of machine vision and image analysis. Some pertinent papers on those topics (and others) are listed in Appendix A. Those papers are herein incorporated by reference.

Figure 1:
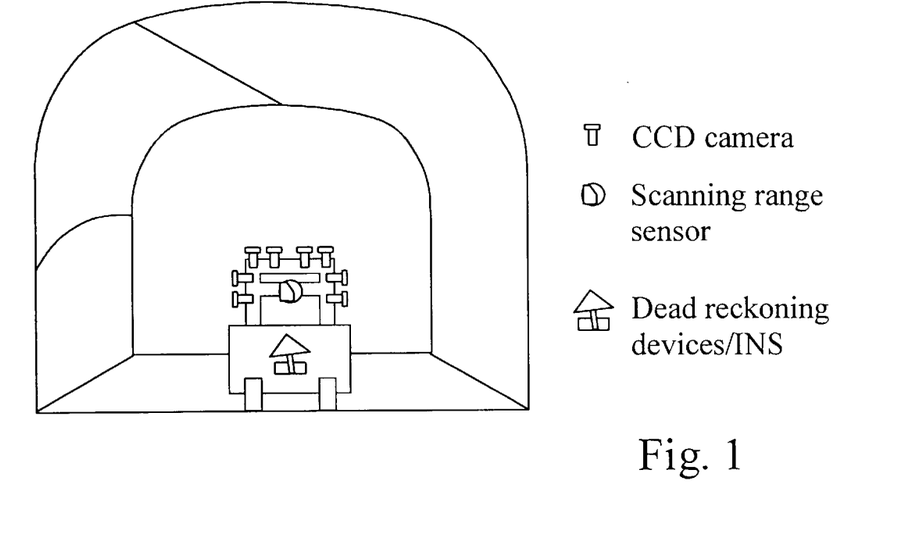
FIG. 1 is a simplified diagram of an apparatus according to this invention located within an enclosed space.

Referring to FIG. 1, the main components of the system are shown. A plurality of intensity image capture means in the form of eight cameras 1 are grouped in at least 4 pairs each disposed within a common plane with lenses 2 being in a single plane. The plurality of intensity image capture means are disposed for capturing images that overlap relative to those captured by adjacent intensity image capture means. A range sensor 3 is located at a central location and disposed to capture a range image of substantially the same surface as that captured by the plurality of intensity image capture means. The apparatus shown in FIG. 1 provides full coverage of side and top views of an indoor site. Modifications can be made to cover other views, for example, a front view, a bottom view, or a 360 degree view. The sensor configuration is mounted on a moveable platform means 4 in the form of a vehicle provided with wheels 5.

Figure 2:
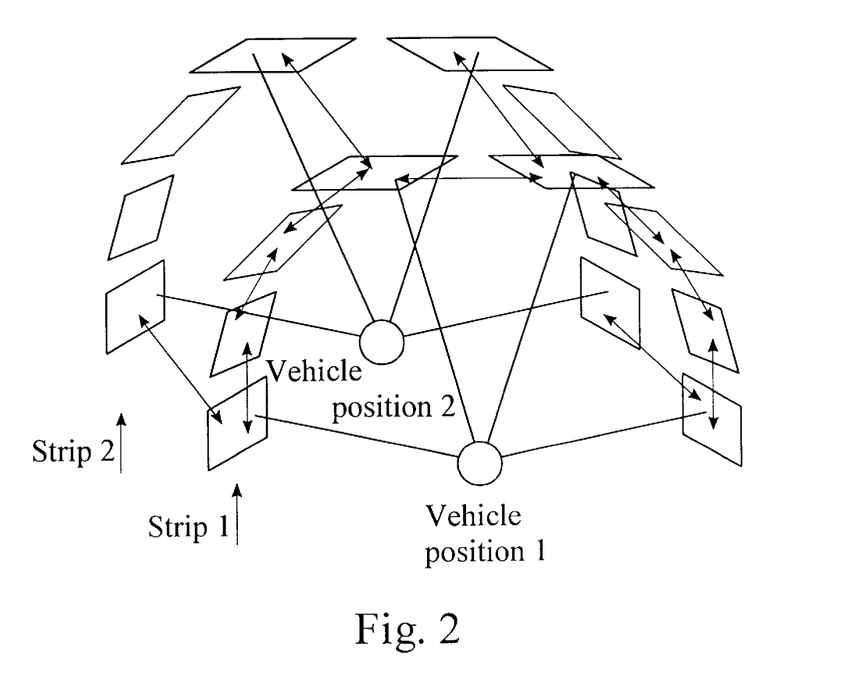
FIG. 2 is a diagram of superimposed image locations for a vehicle in two distinct locations.

Referring to FIG. 2, images within one strip 10 (captured in one vehicle position) are pre-calibrated, i.e. their parameters relative to each other are known. Images in different strips 11 (captured in a different vehicle position) are of unknown location relative to each image from the strip 10. Relative distances and angles are computed from the bundle adjustment approach (simultaneous photogrammetric triangulation of all data from all images). In the bundle adjustment approach, additional constraints in the form of a known relationship of images in each strip 11, are utilized to strengthen the solution. The solution, in general form, is as follows:

Each point, p, extracted from an image, i, has two image coordinates, x and y, and contributes two equations:

$$x_p = f(X_p, Y_p, Z_p, X_i, Y_i, Z_i, pitch_i, yaw_i, roll_i) \quad (1)$$
$$y_p = f(X_p, Y_p, Z_p, X_i, Y_i, Z_i, pitch_i, yaw_i, roll_i)$$

The parameters on the right-hand-side of the above equations are the XYZ coordinates of the point p in the required 3-D coordinate system, and the camera position and orientation (six parameters) in the same coordinate system. Those six camera parameters are the same for all points measured in the same image; however, each point adds three new XYZ coordinates. Since each point adds only two new equations, the solution for all the unknown parameters is not possible. If some of these points appear in another image, they will not add any new XYZ coordinates, but six new camera parameters are added. In the case where a sufficient number of overlapped images with a sufficient number of common points exist, the number of equations is usually larger than the number of unknowns thus a solution is possible. This is the main principle of the photogrammetric triangulation approach known as bundle adjustment (Brown, 1976).

The system of equations to be solved is an overdetermined nonlinear system that requires an iterative solution. In the first iteration, initial values for the unknowns must be provided. If these values are too far from the correct values and the geometric configuration of the cameras is poorly suited for triangulation, this iterative solution will break down. In outdoor mapping systems, the vehicle position, and thus the camera positions, are determined by GPS and INS in combination and not calculated. In indoor mapping, however, since GPS can not be used, the system must solve for all the parameters. The proposed solution overcomes the above mentioned problems associated with bundle adjustment.

Figure 3:
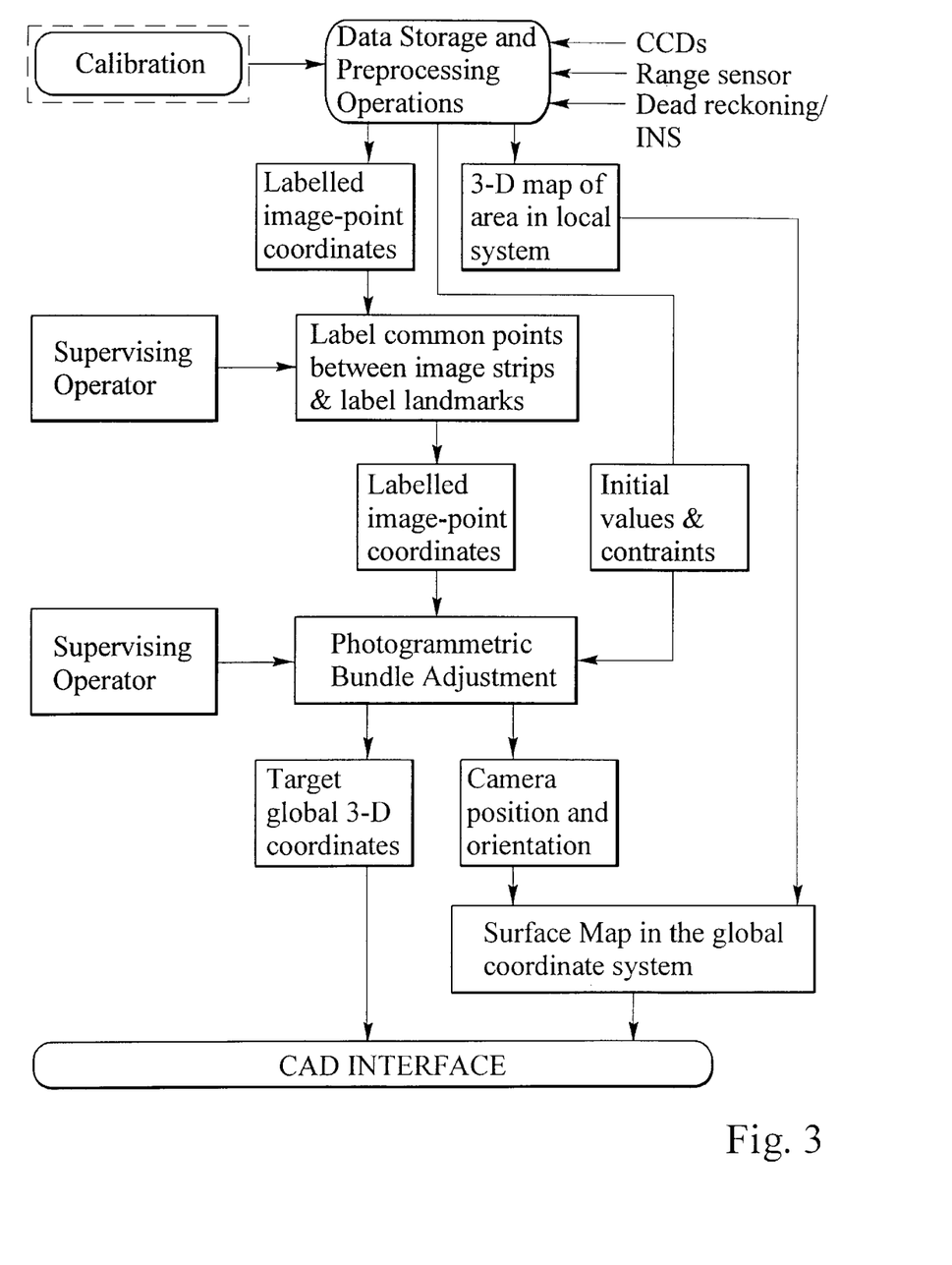
FIG. 3 is a simplified flow diagram of a method according to this invention.

Referring to FIG. 3, a method according to the present invention is described

1—A dead reckoning system 24, such as INS or wheel encoders, provides the initial values for the camera position and orientation parameters.

2—In order to strengthen the geometry of the triangulation, data from the range sensor 3 are used. The added constraint is in the form of geometric relationships between extracted points from the range sensor image and the intensity image as follows:

$$f(X_{p1}, Y_{p1}, Z_{p1}, \ldots X_{pn}, Y_{pn}, Z_{pn}, A, B, \ldots) = 0 \quad (2)$$

Equation (2) describes the relationship between the coordinates of the above mentioned points, where the constants A,B, . . . are known from the range sensor data (for example a distance between two points or parameters of a plane). Equation (2) will be combined with equation (1) to strengthen a bundle adjustment solution.

3—The relationship between the intensity images of each CCD camera is accurately pre-determined by a calibration procedure. This results in another set of constraints to strengthen the solution:

$$f(X_{i1}, Y_{i1}, Z_{i1}, pitch_{i1}, yaw_{i1}, roll_{i1}, \ldots, X_{i8}, Y_{i8}, Z_{i8}, pitch_{i8}, yaw_{i8}, roll_{i8}, a, b, c, \ldots) = 0 \quad (3)$$

Equation (3) describes the relationship between the positions and orientations of a set of eight images from intensity image capture means in the form of eight CCD cameras. The constants a,b,c, . . . are known from the calibration step. Equation (3) is combined with equations (1) and (2) to strengthen bundle adjustment.

The sensor configuration shown in FIG. 1 allows the intensity image capture means 1 in the form of CCDs to capture intensity images as the system moves. Using sufficient non-volatile storage or memory (volatile storage), the images can be stored for each frame or for frames at predetermined intervals. A method of simultaneously correlating a plurality of images from each sensor over contiguous time samples or those at predetermined intervals allows for estimation of vehicle position within acceptable tolerances. This vehicle position is then used to accurately locate certain landmarks or features within the space modeled or the images captured. Modeling of other landmarks or features occurs relative to the located landmarks or features resulting in accurate models of spaces such as those inside houses, buildings, caves, ships, and stations.

Figure 4A:
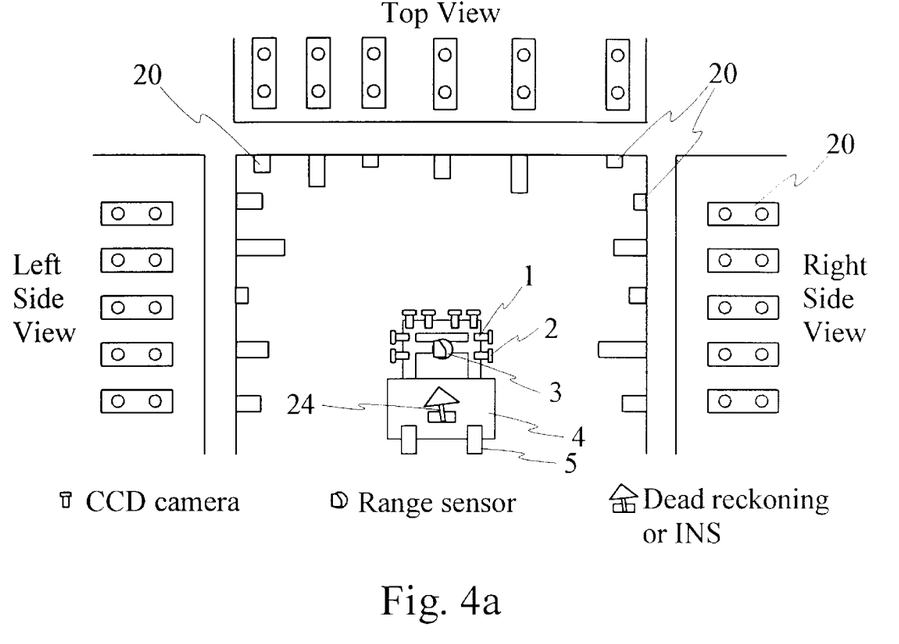
FIG. 4a is a top view of a registration or calibration space with target objects at predetermined locations.
Figure 4B:
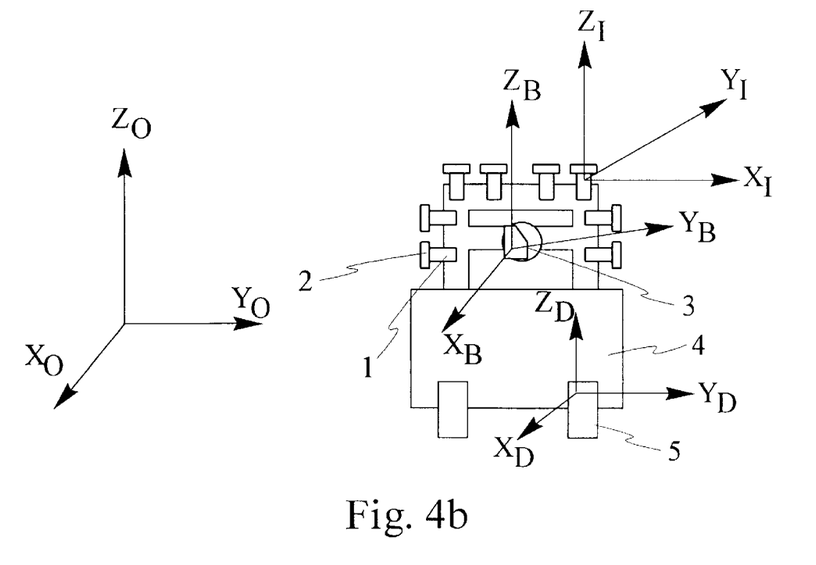
FIG. 4b is a diagram illustrating registration.

The calibration procedure will now be described with reference to FIG. 4. A sufficient number of targets 20 having precisely known positions is imaged by each sensor in the form of intensity image capture means 1 and range image capture means 3. The known positions of the targets 20 are used to solve for intensity image capture means parameters in the form of CCD-camera parameters, using equations (1), and to establish a relationship between a range image capture means coordinate system and intensity image capture means images (registration). A relationship between a reference coordinate system and that of the intensity image capture means 1 and the range image capture means 3 is also established. A result of the calibration procedure is that all image capture means data is related to a common coordinate system defined by the known coordinates of calibration targets. The relationships can be described by:

$$\begin{bmatrix} X \\ Y \\ Z \end{bmatrix}_o^n = S \cdot R \begin{bmatrix} X \\ Y \\ Z \end{bmatrix}_s^n + \begin{bmatrix} X \\ Y \\ Z \end{bmatrix}_{os} \quad (4)$$

where S is the scale factor, R is a rotation matrix (function of three rotation angles), o is the object coordinate system (the reference system), s is the image capture means coordinate system (may be the CCD camera, i.e. from 1 to 8, or the range sensor 0), n is any point that is seen by a sensor. When points which have known coordinates in the reference system (shown in FIG. 4a) are imaged, one can solve for the scale factor S, the rotation matrix R, and the shift vector [X Y Z]$_{os}$. For the dead-reckoning device 24, measuring vehicle movements from one location to another, registration parameters are determined by moving the vehicle from one known position to another during calibration. Once calibration is complete, similar motions are solved based on a plurality of images, range image capture means data, registration matrices, and other known parameters. Preferably, the amount of information acquired from the image capture means taken together with the registration information leads to a unique solution of a model.

Figure 5:
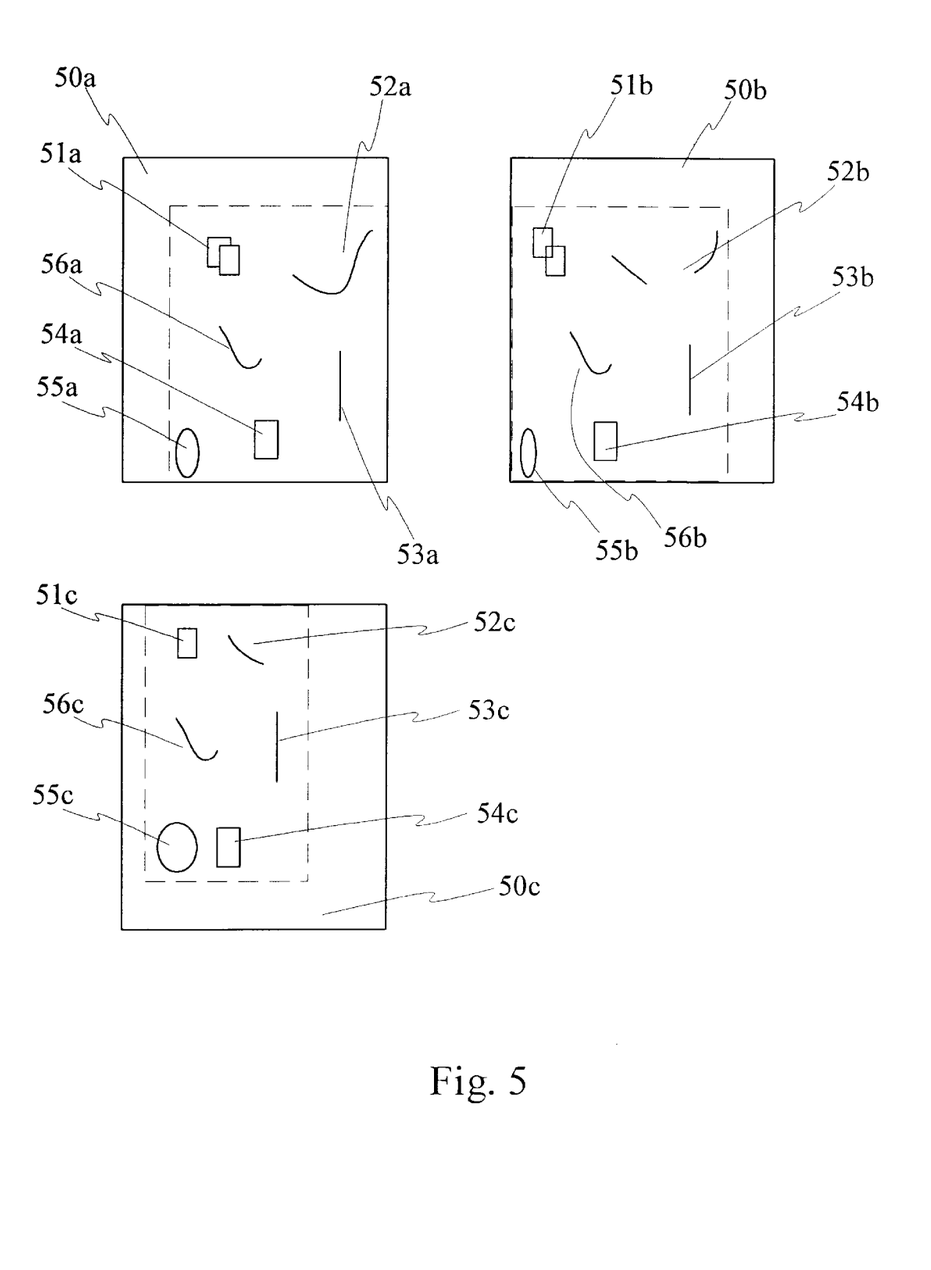
FIG. 5 is a diagram illustrating three images and extracted features.

The feature extraction process will now be described. Referring to FIG. 5 three simplified representations of images are shown having an overlapping region. The overlap is identified by a perimeter of dashed lines. Within the region, it is preferable to find at least 3 features that are visible within each image and do not lie within a single line. Each image is analyzed individually. Features are selected as identifiable markings (or shapes) in two dimensions that are not commonly repeated. Preferably, at least some of the features have an identifiable orientation. For buildings, features may be in the form of scratches in a surface, colour patterns on a surface, objects hanging on or near a surface, openings, cracks, corners, paint bubbles, dirt, etc. For mines, features may be in the form of cracks, corners, smooth sections, outcroppings, etc.

Image 50a is first analyzed and features denoted by numbers 51a through 56a are located. Preferably, many features are located in order to increase the chances of locating three features that are common across overlapping images. Features are listed along with their locations for use in correlation. Image 50b is next analyzed and even within the region different features are extracted. This may be caused by changing shadows as at 51b or by three dimensional features as at 55b or simply by reflective surfaces as at 52b. It is also possible that some features may not be distinguishable in an image whereas the same feature is clear in other images. The features of the image are stored as locations and other pertinent data. Preferably, the process is repeated for each image. Although all the features shown to be extracted are within the overlap region of the images 50a and 50b, this is unlikely to be the case. Likely, features will be extracted within and outside a region of overlap.

Figure 6:
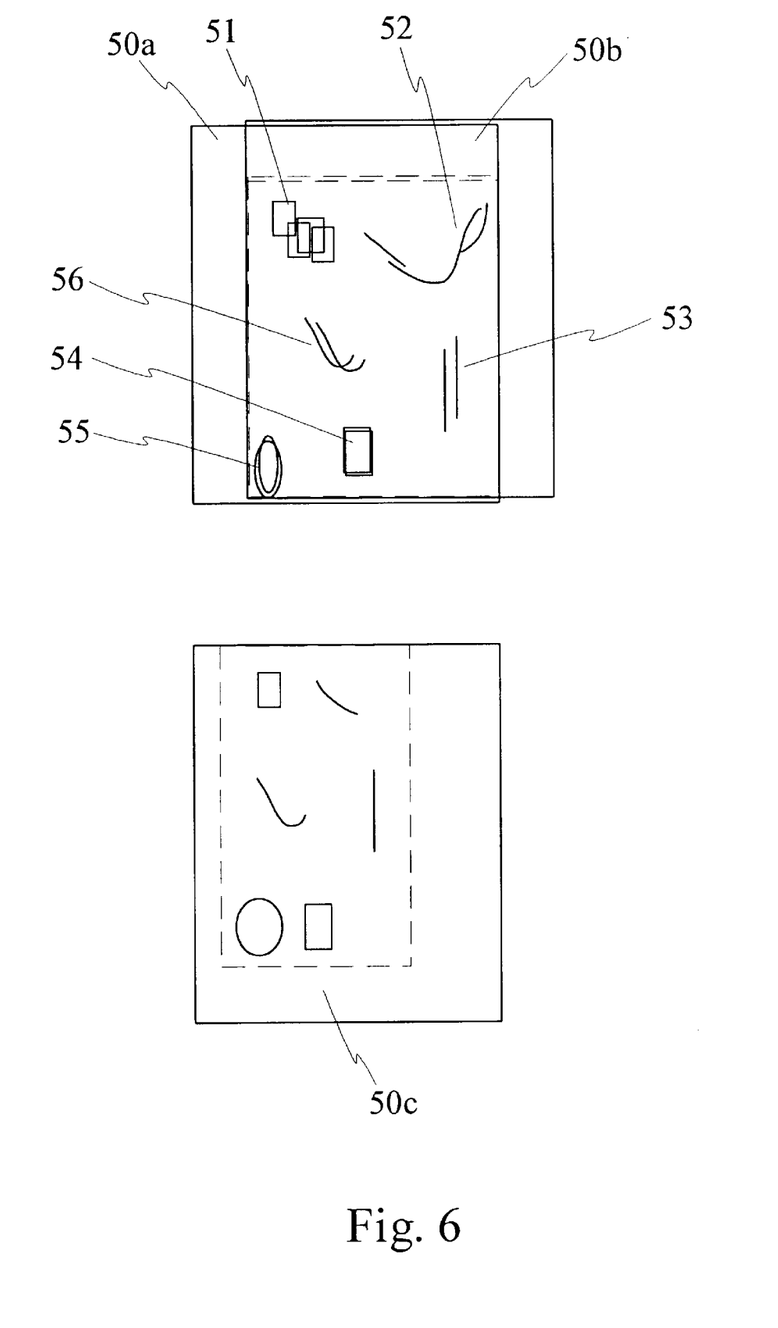
FIG. 6 is a diagram illustrating alignment and overlap of the images of FIG. 5.

The feature alignment and image overlap will now be described with reference to FIG. 6. The features of images 50a and 50b are now shown aligned. The nature of intensity images captured according to the invention is that rotation and scale may vary (because the image capture means captures a 2D representation of a 3D surface); the mapping takes into account these factors. FIG. 50c is shown below the overlapped image to indicate a need for scaling. Scaling accuracy is improved through use of range image capture means data to determine distance. In areas where features are difficult to extract, features in the form of dots or other identifiable marks such as structured light may be added to surfaces to be modeled. It is important when adding features that their location on the surfaces remain known or constant in order to allow a plurality of images to be correlated. When sufficient features exist, a substantially strong solution is generated aligning a majority of intensity images to define the at least a surface. The location, distance, and angle of each image is stored.

When insufficient features exist, extrapolation is used to fill in unmodeled areas. The extrapolation is based on intervening (and relatively featureless) intensity images and range images. An extrapolation, for example, overlaps intensity images based on wheel encoder values or range sensor information in the absence of features. Generally, a solution is best when no such extrapolation is necessary or where extrapolation is only necessary between known locations or between images captured concurrently by a plurality of intensity image capture means where the image capture means are pre-calibrated.

The modeling of a space will now be described with reference to the previous descriptions. The stored image locations, rotations, and feature distances are used to establish absolute locations for each feature. A mapping of each feature in 3 dimensional space is used to map the intensity images onto a grid formed by the feature locations. This results in a substantially accurate spatial representation with further substantially accurate intensity representation of the space. A model generated in this fashion is useful in virtual reality, modeling applications, spatial analysis, construction verification, planning for cave hiking or mines, and many other applications.

Figure 7A:
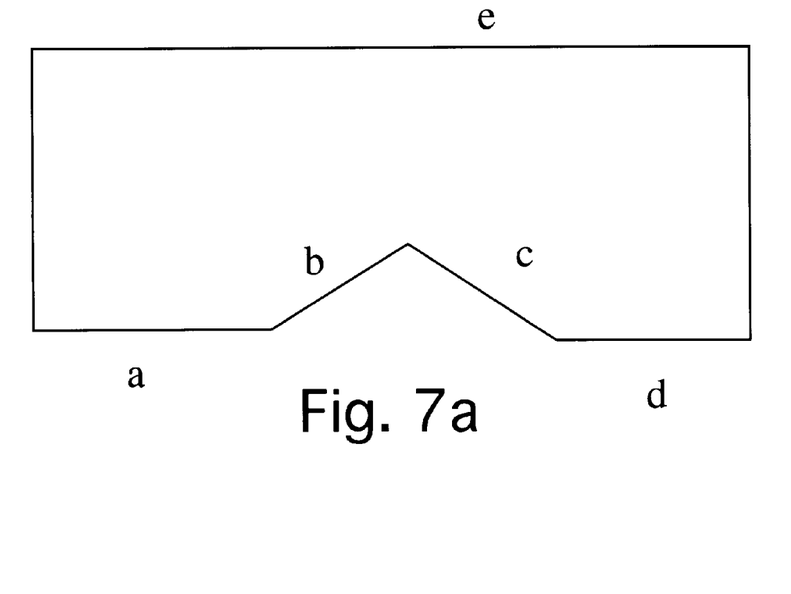
FIG. 7a is a diagram illustrating a cross section of a room to be modeled.
Figure 7B:
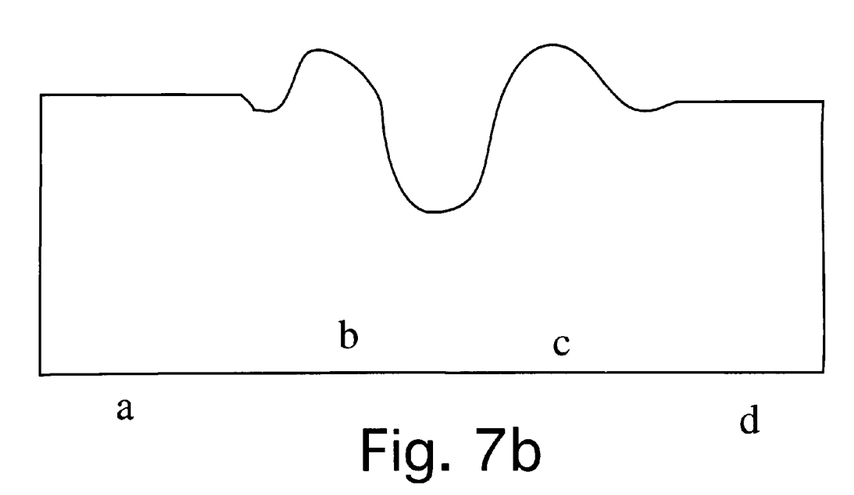
FIG. 7b is a diagram illustrating a cross section of a model of the room of FIG. 7a as estimated using range sensor data and wheel encoders or inertial sensing systems.

Referring to FIG. 7a a cross section of a room for modeling is shown. The ceiling is substantially flat as are the walls. In the centre of the floor, there is a ramp. A device according to the prior art traversing the floor from a to d and capturing intensity images and range images will encounter difficulties in modeling due to the ramp. A model of the space as determined by range images and wheel encoding values is shown in FIG. 7b. As the device tilts to climb the ramp, the ceiling appears to move further away. The ceiling then dips slowly as the ramp is climbed. At the top of the ramp the device peaks and the ceiling appears to quickly dip and then rise again. Further, because each ramp forms a hypotenuse to a triangle, the model is elongated where the ramp is.

Using differential analysis of intensity images does not model the space sufficiently accurately. Therefore, according to this invention, a method is employed simultaneously solving for each extracted feature location to determine a "best" model that closely models the room of FIG. 7a. The identification and alignment of features is important because, as in this example, interior distance measurement is not absolute and accounting for slip, skid, bumps, dirt, etc. is necessary.

Numerous other embodiments may be envisaged without departing from the spirit and scope of the invention.

Aussems, T. and Braess, M., 1995 . . . Mobile mapping using a surveying vehicle integrating GPS, wheel sensors and digital video cameras. Workshop on Integrated Acquisition and Interpretation of Photogrammetric Data, November 8–10, Stuttgart, Germany.

Barshan, B. and Durrant-Whyte, H. F., 1995. Inertial navigation systems mobile robots. IEEE Transactions on Robotics and Automation, 11(3), June, pp. 328–342.

Blais, F., M. Lecavalier, J. Domey, P. Boulanger, and J. Courteau, 1992. Application of the BIRIS range sensor for wood volume measurement, NRC/ERB-1038, 19 pages.

Brown, D. C., 1976. The bundle adjustment—Progress and prospectives. International Archives of Photogrammetry, 21(3): paper no. 3-03-041, 33 pages, ISP Congress, Helsinki, Finland.

El-Hakim, S. F. and Pizzi, N., 1993. Multi-camera vision-based approach to flexible feature measurement for inspection and reverse engineering. Optical Engineering, 32(9), pp. 2201–2215.

El-Sheimy, N., 1995. A unified approach to multi-sensor integration in Photogrammetry. Workshop on Integrated Acquisition and Interpretation of Photogrammetric Data, November 8–10, Stuttgart, Germany.

Heister, H., Caspary, W., Hock, Chr., Klemm, H., and Sternberg, H., 1995. The mobile mapping system—KiSS—. Workshop on Integrated Acquisition and Interpretation of Photogrammetric Data, November 8–10, Stuttgart, Germany.

Karara, H. M., ed., 1989. *The Handbook of Non-Topographic Photogrammetry*, 2nd ed., American Society of Photogrammetry and Remote Sensing.

Kortkov, E. and Hoffman, R., 1994. Terrain mapping for a walking planetary rover. IEEE Transactions on Robotics and Automation. 10(6), December, pp. 728–739.

Novak, K., 1995. Mobile mapping technology for GIS data collection. Photogrammetric Engineering & Remote Sensing, 61(5), pp. 493–501.

Schwarz, K. P., M. A. Chapman, M. W. Cannon, and P. Gong, 1993, An integrated INS/GPS approach to the geo-referencing of remotely sensed data, Photogrammetric Engineering & Remote Sensing, 59(11), pp. 1667–1674.

Weckesser, P., Dillmann, R., Elbs, M., and Hampel, S., 1995. Multiple sensor-processing for high-precision navigation and environmental modeling with a mobile robot. In International Conference on Intelligent Robots and Systems; Human Robot Interaction and Cooperative Robots, IROS, August.

What we claim is:

1. A method of locating at least a surface and modeling the surface comprising the steps of:
   a) repeating the following steps:
      i) using at least two image capture means having a known spatial relationship therebetween, capturing with each image capture means an image, each of the at least two of image capture means having an image overlapping an image of at least another image capture means from the at least two image capture means;
      ii) moving the at least two image capture means to a new location such that each image captured from the new location overlaps at least a previously captured image until a plurality images have been captured of substantially the entire surface;
   b) within each image from the plurality of images using a processor to identify distinguishable features;
   c) using a processor, aligning identified features in overlapped images using the known spatial relationship between the at least two image capture means as constraints to determine correlations of spatial relations for overlapped images; and
   d) using a processor, locating the at least a surface and modeling the at least a surface by mapping the images onto a grid in three-dimensional space and determining the surface that substantially best approximates the correlations and is within the constraints.

2. A method of locating at least a surface and modeling the surface as defined in claim 1 wherein images captured from a same platform location by an image capture means and by adjacent image capture means overlap.

3. A method of locating at least a surface and modeling the surface as defined in claim 2 wherein images captured from a same platform location by an image capture means, by adjacent image capture means, and by image capture means adjacent the adjacent image capture means overlap.

4. A method of locating at least a surface and modeling the surface as defined in claim 2 wherein at least an image capture means is a range image capture means.

5. A method of locating at least a surface and modeling the surface as defined in claim 2 wherein at least an image capture means is an intensity image capture means.

6. A method of locating at least a surface and modeling the surface comprising the steps of:
   (a) providing intensity images from a plurality of image capture means having a known spatial relation said images overlapping in part;
   (b) providing range images from at least a range image capture means said images overlapping the intensity images at least in part and overlapping at least some other range images in part;
   (c) providing registration information in dependence upon known spatial relations between each of the plurality of the image capture means and the at least a range imaging means;
   (d) extracting distinguishable features from each intensity image and each range image;
   (e) using a processor, correlating the intensity images and the range images in dependence upon the registration information and extracted features located within a plurality of intensity and range images; and
   (f) using a processor, locating at least a surface and constructing a model in dependence upon the intensity images and the range images by overlaying at least some intensity images onto the surface in a fashion that best approximates the correlations.

7. A method of locating at least a surface and modeling the surface as defined in claim 6 further comprising the steps of providing movement information in dependence upon a dead-reckoning means and determining initial estimates of location for each image in dependence upon the movement information.

8. A method of locating at least a surface and modeling the surface as defined in claim 7 wherein the model construction is performed in further dependence upon computed vehicle positions.

9. A system for modeling three dimensional space comprising:
   (a) a movable platform;
   (b) a plurality of image capture devices coupled to said movable platform in known locations and for capturing a plurality of intensity images at least some of the images overlapping each other;
   (c) at least a range image capture device coupled to said movable platform in at least a known location and for capturing a plurality of range images;
   (d) a memory for receiving the captured intensity images and the captured range images and for storing information indicative of a spatial relation between the captured intensity images and the captured range images and for storing the images; and (e) a processor coupled to the memory for correlating the plurality of stored intensity images, the plurality of stored range images, the known locations of the intensity image capture devices, and the known location of the range image capture devices and generating a model in dependence upon the correlation.

10. A system for modeling three dimensional space as defined in claim 9 further comprising a dead-reckoning means.

11. A system for modeling three dimensional space as defined in claim 10 wherein said dead reconing means comprise wheel encoders.

12. A system for modeling three dimensional space as defined in claim 9 further comprising an inertial navigation system.

13. A system for modeling three dimensional space as defined in claim 9 wherein each of said plurality of intensity image capture devices are for capturing intensity images that overlap intensity images captured by adjacent intensity image capture devices.

14. A system for modeling three dimensional space as defined in claim 10 wherein the intensity images overlap the at least a range image captured at a same movable platform location.

15. A system for modeling interior three dimensional spaces as defined in claim 10 wherein the plurality of intensity image capture devices is formed of at least 4 intensity image capture devices linearly arranged along one side and at least 2 intensity image capture devices along at least another side.

* * * * *